United States Patent

Miyake et al.

[11] Patent Number: 5,880,211
[45] Date of Patent: Mar. 9, 1999

[54] RTV ORGANOPOLYSILOXANE COMPOSITIONS

[75] Inventors: Masatoshi Miyake; Keisuke Imai; Koji Yokoo; Masaharu Sato, all of Usui-gun, Japan

[73] Assignee: Shin-Etsu Chemical Co., Ltd., Japan

[21] Appl. No.: 767,812

[22] Filed: Dec. 17, 1996

[30] Foreign Application Priority Data

Dec. 18, 1995 [JP] Japan .................................. 7-348321
Aug. 23, 1996 [JP] Japan .................................. 8-241439

[51] Int. Cl.$^6$ ...................................... C08L 83/06
[52] U.S. Cl. ......................... 524/773; 523/212; 524/322; 524/425; 524/788; 524/789
[58] Field of Search .................... 524/773, 788, 524/789, 425, 322; 523/212

[56] References Cited

U.S. PATENT DOCUMENTS

| | | | |
|---|---|---|---|
| 5,118,738 | 6/1992 | Berthet | 524/788 |
| 5,212,010 | 5/1993 | Curzio et al. | 442/208 |
| 5,405,889 | 4/1995 | Hatanaka | 524/788 |

FOREIGN PATENT DOCUMENTS 05039422  2/1993  Japan .

*Primary Examiner*—Patricia A. Short
*Attorney, Agent, or Firm*—Millen, White, Zelano, & Branigan, P.C.

[57] ABSTRACT

In an RTV organopolysiloxane composition comprising a hydroxy-terminated diorganopolysiloxane and an organic silicon compound having at least three hydrolyzable groups, there is blended calcium carbonate which has been treated with 1–2.5% by weight of an agent having a melting or softening point of at least 100° C. or a saturated fatty acid having at least 21 carbon atoms. The composition is adhesive to even surface treated aluminum plates and maintain a firm bond under water immersion and at elevated temperatures.

15 Claims, No Drawings

RTV ORGANOPOLYSILOXANE COMPOSITIONS

BACKGROUND OF THE INVENTION

1. Field of the Invention

This invention relates to room temperature vulcanizable organopolysiloxane compositions which are readily vulcanizable with moisture in the air to form rubbery elastomers having improved water immersion and thermoresistant adhesion.

2. Prior Art

Room temperature vulcanizable (RTV) organopolysiloxane compositions which readily cure with moisture to form rubbery elastomers are well-known in the art. They are widely used in a variety of fields as adhesives, coatings, electrically insulating sealants, and building sealants because the cured elastomers have excellent characteristics including weather resistance, durability and freeze resistance.

Recently, acryl resin and fluoro-resin electrodeposited aluminum members featuring weather resistance and having a less adhesive surface have been utilized as building exterior materials. RTV organopolysiloxane compositions do not firmly bond to such aluminum members surface coated with acryl resins and fluoro-resins. The organopolysiloxane compositions applied to the surface coated aluminum members also suffer from the problem that they become peeled when immersed in water for a long time.

Known RTV organopolysiloxane compositions are often loaded with calcium carbonate as a filler. For example, JP-A 39422/1993 discloses the use of calcium carbonate which has been treated with 3% by weight of a treating agent in the form of rhodinic acid. The use of calcium carbonate as a filler is also proposed in JP-A 179760/1995 and U.S. Pat. No. 5,405,889 (issued Apr. 11, 1995). Allegedly these compositions are also improved in anti-spitting and adhesion. These compositions, however, are not satisfactory in water immersion and thermoresistant adhesion to less adhesive surface coatings on aluminum members and mortar.

It was proposed by Dow Corning Toray Silicone Co. to use a filler blend of calcium carbonate treated with stearic acid and fumed silica. In water immersion and heating tests, however, the stearic acid on the surface of calcium carbonate leaches out to adversely affect the adhesion. This proposal is thus not satisfactory in performance.

SUMMARY OF THE INVENTION

Therefore, an object of the present invention is to provide a novel and improved RTV organopolysiloxane composition which cures into a product firmly bondable to surface treated aluminum members and maintaining improved water immersion and thermoresistant adhesion.

According to the present invention, there is provided a room temperature vulcanizable (RTV) organopolysiloxane composition comprising (1) a diorganopolysiloxane of the following general formula (I):

$$\text{HO} - (\text{SiO})_n - \text{H} \quad \text{with } R^1 \text{ substituents} \tag{I}$$

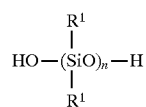

wherein $R^1$ is a substituted or unsubstituted monovalent hydrocarbon group and n is a positive integer, (2) an organic silicon compound having at least three hydrolyzable groups in a molecule, and (3) calcium carbonate which has been treated with up to 2.5% by weight based on the calcium carbonate of an agent having a melting or softening point of at least 100° C. or a saturated fatty acid represented by $C_mH_{2m+1}COOH$ wherein m is an integer of at least 20. The composition may optionally contain (4) a fumed silica filler.

When calcium carbonate which has been treated with up to 2.5% by weight, preferably 1 to 2.5% by weight of an agent having a melting or softening point of at least 100° C. or a saturated fatty acid as defined above is blended in an RTV organopolysiloxane composition comprising a diorganopolysiloxane of formula (I) and an organic silicon compound having at least three hydrolyzable groups, the resulting composition will cure into a product which well adheres to adherends, especially aluminum members surface treated with fluoro-resins and acryl resins, for example. The cured product maintains adhesion to such adherends upon water immersion and at elevated temperatures. Further blending of fumed silica filler improves the adhesion of the composition to mortar. In this way, the invention overcomes the problems of the prior art.

DETAILED DESCRIPTION OF THE INVENTION

The RTV organopolysiloxane composition of the present invention uses as a base polymer a diorganopolysiloxane of the following general formula (I):

wherein $R^1$ is a substituted or unsubstituted monovalent hydrocarbon group and letter n is a positive integer.

In formula (I), $R^1$ is a substituted or unsubstituted monovalent hydrocarbon group, preferably selected from those of 1 to 10 carbon atoms, more preferably those of 1 to 8 carbon atoms, for example, alkyl groups such as methyl, ethyl, propyl, butyl and hexyl, aryl groups such as phenyl and tolyl, alkenyl groups such as vinyl, allyl, butenyl, and hexenyl, cycloalkyl groups such as cyclohexyl, aralkyl groups such as benzyl and 2-phenylethyl, and substituted ones of these groups wherein some or all of the hydrogen atoms attached to carbon atoms are replaced by halogen atoms or cyano groups, such as chloromethyl, trifluoropropyl and cyanoethyl. Especially preferred are methyl, phenyl, vinyl, and trifluoropropyl groups.

Letter n, which is a positive integral number corresponding to a degree of polymerization, is preferably a positive integer of 50 to 2,000, especially 100 to 2,000 when viscosity and workability are taken into account. Preferably the value of n is adjusted such that the diorganopolysiloxane of formula (I) may have a viscosity of 50 to 1,000,000 centistokes at 25° C., especially 700 to 100,000 centistokes at 25° C.

Illustrative examples of the diorganopolysiloxane of formula (I) are given below.

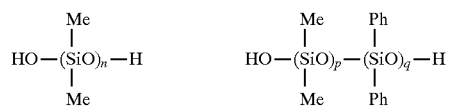

-continued

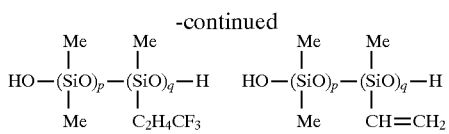

In the formulae, Me is methyl, Ph is phenyl, p and q are positive integers, p+q is an integer corresponding to n.

The second component is an organic silicon compound having at least three hydrolyzable groups in a molecule. It serves as a curing agent and is essential for the inventive composition to cure at room temperature in the presence of moisture. The organic silicon compound may be selected from well-known curing agents for conventional RTV condensation type organopolysiloxane compositions.

Examples of the hydrolyzable group in the organic silicon compound include alkoxy groups such as methoxy, ethoxy, propoxy, butoxy, and methoxyethoxy; alkenyloxy groups such as propenoxy, isobutenyloxy, and 1-ethyl-2-methylvinyloxy; ketoxime groups such as dimethylketoxime, methylethylketoxime, diethylketoxime, cyclopentanoxime, and cyclohexanoxime; acyloxy groups such as acetoxy, propionoxy, butyroyloxy, and benzoyl; amino groups such as N-methylamino, N-ethylamino, N-propylamino, N-butylamino, N,N-dimethylamino, N,N-diethylamino, and cyclohexylamino; amide groups such as N-methylacetamide and N-methylbenzamide; aminoxy groups such as N,N-dimethylaminoxy and N,N-diethylaminoxy; isocyanato group; α-silylester groups; and halogen atoms such as chloro. Especially preferred are methoxy, dimethylketoxime, diethylketoxime, and methylethylketoxime groups.

In addition to the hydrolyzable groups, the organic silicon compound may have another group attachable to a silicon atom, for example, a substituted or unsubstituted monovalent hydrocarbon group as defined for $R^1$ in the first component. Alkyl groups having 1 to 8 carbon atoms, alkenyl groups having 2 to 10 carbon atoms and phenyl groups are preferred because of ease of synthesis.

Illustrative, non-limiting examples of the organic silicon compound as the second component include alkoxysilanes such as methyltrimethoxysilane, vinyltrimethoxysilane, phenyltrimethoxysilane, methyltriethoxysilane, tetramethoxysilane, tetraethoxysilane, tetrapropoxysilane, and 3-chloropropyltrimethoxysilane; enoxysilanes such as methyltriisopropenoxysilane, vinyltriisopropenoxysilane, and phenyltriisopropenoxysilane; ketoximesilanes such as methyltris(methylethylketoxime)silane, vinyltris(methylethylketoxime)silane, phenyltris(methylethylketoxime)silane, methyltris(dimethylketoxime)silane, and tetrakis(methylethylketoxime)silane; aminosilanes such as methyltriacetoxysilane, vinyltriacetoxysilane, and phenyltris(N,N-diethylamino)silane; aminoxysilanes such as methyltris(N-methylacetamido)silane, vinyltris(N-aminoxy)silane, and vinyltris(N,N-diethylaminoxy)silane; and partial hydrolyzates of these compounds.

Preferably the organic silicon compound as the second component is blended in an amount of 0.2 to 30 parts, especially 0.5 to 20 parts by weight per 100 parts by weight of the diorganopolysiloxane of formula (I) as the first component. Less than 0.2 part of the organic silicon compound would cause undercuring of the composition. More than 30 parts of the organic silicon compound would cause the composition to cure into a hard and brittle product losing sealant capabilities.

According to the invention, there is blended as a third component calcium carbonate which has been treated with a treating agent. The treating agent is one having a melting or softening point of at least 100° C. or a saturated fatty acid represented by $C_mH_{2m+1}COOH$ wherein m is an integer of at least 20. Calcium carbonate is treated with up to 2.5% by weight of the treating agent based on the weight of calcium carbonate.

It is essential that calcium carbonate as the third component has been treated with a treating agent having a melting or softening point of at least 100° C. or a saturated fatty acid represented by $C_mH_{2m+1}COOH$ wherein m is as defined above. More adhesion and durability are accomplished when the following requirements are met.

(A) Calcium carbonate having a mean particle size of up to 0.2 μm is used.

(B) The amount of the treating agent ranges from 1 to 2.5% by weight based on the weight of calcium carbonate.

The calcium carbonate used herein is preferably a particulate one having a mean particle size of up to 0.2 μm, more preferably 0.01 to 0.2 μm, most preferably 0.01 to 0.1 μm. With a mean particle size of more than 0.2 μm, the resulting silicone rubber would have insufficient mechanical strength.

In one embodiment, calcium carbonate is treated with a treating agent having a melting or softening point of at least 100° C., preferably 150° to 400° C. Calcium carbonate having been treated with a treating agent having a melting or softening point of less than 100° C. fails to form a bond which is resistant to heat and tolerant against warm water immersion. Saturated fatty acids represented by $C_mH_{2m+1}COOH$ wherein m is an integer of at least 20 are also useful as a treating agent even if their melting or softening point is less than 100° C. The objects of the invention are not accomplished by saturated fatty acids represented by $C_mH_{2m+1}COOH$ wherein m is an integer of less than 20.

The treating agent with which the calcium carbonate is treated is preferably selected from those water-immiscible agents having a melting or softening point of at least 1000° C., including rhodinic acid, silicone resins, and saturated fatty acids represented by $C_mH_{2m+1}COOH$ wherein m is an integer of at least 20, especially at least 35.

The amount of the treating agent used is up to 2.5%, preferably 1 to 2.5%, more preferably 1.5 to 2.5% by weight based on the weight of calcium carbonate to be treated therewith. If the amount of the treating agent used is outside this range, the composition fails to form a bond which is resistant to heat and tolerant against warm water immersion. Treatment of calcium carbonate may be done by conventional techniques.

Preferably the treated calcium carbonate as the third component is blended in an amount of 10 to 100 parts, especially 25 to 90 parts by weight per 100 parts by weight of the diorganopolysiloxane as the first component. Compositions with less than 10 parts of the treated calcium carbonate would flow too much and become rather difficult to work whereas compositions with more than 100 parts of the treated calcium carbonate would become too hard and also difficult to work.

In one preferred embodiment, a fumed silica filler is blended in the composition as a fourth component. Then the composition is further improved in adhesion to not only surface treated aluminum members, but also mortar. As compared with compositions filled solely with calcium carbonate, compositions filled with both calcium carbonate and fumed silica will effectively fill in interstices to prevent water penetration, achieving better adhesion under water immersion. In cured products, the calcium carbonate and fumed silica filled together cooperate to effectively absorb external forces so that little force is applied to the interface with the adherend or support and interfacial separation scarcely occurs.

The fumed silica used herein may be either surface treated or not. Fumed silicas surface treated with hexamethyldisilazane, chlorosilane and alkoxysilanes are preferred from the standpoints of shelf stability and physical properties. It is also preferred to use fumed silica having a specific surface area of at least 50 m$^2$/g, especially 100 to 400 m$^2$/g.

Preferably the fumed silica as the fourth component is blended in an amount of 0.1 to 30 parts, especially 1 to 10 parts by weight per 100 parts by weight of the first and third components combined when workability and rubber physical properties are taken into account. Compositions with more than 30 parts of fumed silica would become too hard adversely affecting workability and physical properties. Less than 0.1 part of fumed silica would not alter physical properties.

For promoting curing of RTV organopolysiloxane compositions, a condensation catalyst is preferably used. The condensation catalyst used herein may be selected from known condensation catalysts commonly used in similar compositions as a curing promoter, for example, organic tin compounds such as dibutyltin methoxide, dibutyltin diacetate, dibutyltin dioctate, dibutyltin dilaurate, dimethyltin dimethoxide, and dimethyltin diacetate; organic titanium compounds such as tetrapropyl titanate, tetrabutyl titanate, tetra-2-ethylhexyl titanate, and dimethoxytitanium diacetylacetonate; amine compounds such as hexylamine, 3-aminopropyltrimethoxysilane, and tetramethylguanidylpropyltrimethoxysilane; and salts thereof alone or in admixture of two or more.

Preferably the condensation catalyst is used in an amount of up to 10 parts, especially 0 to 5 parts by weight per 100 parts by weight of the diorganopolysiloxane as the first component. More than 10 parts of the condensation catalyst would cause undercuring, detracting from sealing capability.

In addition to the condensation catalyst, the composition of the invention may further have blended therein various additives such as fillers, pigments, dyes, tackifiers, thixotropic agents, rust-preventing agents, flame retardants, and antiseptic agents. These optional components may be blended in conventional amounts insofar as the objects of the invention are not impaired.

The RTV organopolysiloxane composition of the invention is well bondable to adherends, especially surface treated aluminum members and cures into a product which maintains a firm bond under water immersion and at elevated temperatures. The composition will thus find use as adhesives, coatings, electrically insulating sealants, and building sealants.

EXAMPLE

Examples are given below by way of illustration and not by way of limitation. All parts are by weight. The viscosity is as measured at 25° C.

Example 1

An RTV organopolysiloxane composition was obtained by charging a universal mixer with 60 parts of α,ω-dihydroxydimethylpolysiloxane having a viscosity of 50,000 centistokes, 40 parts of calcium carbonate with a particle size of 0.08 μm and treated with 2.0% by weight of rhodinic acid (melting point 162° C.), 6 parts of (methylethylketoxime)silane, 0.02 part of polypropylene glycol, 0.1 part of dibutyltin dimethoxide, and 1 part of γ-aminopropyltriethoxysilane, followed by debubbling and mixing.

Example 2

An RTV organopolysiloxane composition was obtained by the same procedure as in Example 1 except that 40 parts of calcium carbonate with a particle size of 0.08 μm and treated with 2.0% by weight of $C_{35}H_{71}COOH$ (melting point 101° C.) was used instead of the 2.0% rhodinic acid-treated calcium carbonate.

Example 3

An RTV organopolysiloxane composition was obtained by the same procedure as in Example 1 except that 40 parts of calcium carbonate with a particle size of 0.08 μm and treated with 2.0% by weight of a phenylsilicone resin (softening point 150° C.) was used instead of the 2.0% rhodinic acid-treated calcium carbonate.

Example 4

An RTV organopolysiloxane composition was obtained by the same procedure as in Example 1 except that 40 parts of calcium carbonate with a particle size of 0.08 μm and treated with 2.0% by weight of a dimethylsilicone resin (softening point 110° C.) was used instead of the 2.0% rhodinic acid-treated calcium carbonate.

Example 5

An RTV organopolysiloxane composition was obtained by the same procedure as in Example 1 except that 40 parts of calcium carbonate with a particle size of 0.15 μm and treated with 2.0% by weight of rhodinic acid was used.

Example 6

An RTV organopolysiloxane composition was obtained by the same procedure as in Example 1 except that 25 parts of α,ω-dihydroxydimethylpolysiloxane having a viscosity of 20,000 centistokes and 35 parts of α,ω)-dihydroxydimethylpolysiloxane having a viscosity of 100,000 centistokes were used as the dimethylpolysiloxane and 40 parts of calcium carbonate with a particle size of 0.06 μm and treated with 2.0% by weight of rhodinic acid was used.

Example 7

An RTV organopolysiloxane composition was obtained by the same procedure as in Example 1 except that 7 parts of methyltrimethoxysilane was used instead of 6 parts of (methylethylketoxime)silane.

Comparative Example 1

An RTV organopolysiloxane composition was obtained by the same procedure as in Example 1 except that 40 parts of calcium carbonate with a particle size of 0.08 μm and treated with 2.0% by weight of liquid oleic acid was used instead of the 2.0% rhodinic acid-treated calcium carbonate and 0.1 part of dimethyltin dimethoxide was used instead of the dibutyltin dimethoxide.

Comparative Example 2

An RTV organopolysiloxane composition was obtained by the same procedure as in Comparative Example 1 except that 40 parts of calcium carbonate with a particle size of 0.08 μm and treated with 2.0% by weight of stearic acid (melting point 72° C.) was used instead of the 2.0% oleic acid-treated calcium carbonate.

Comparative Example 3

An RTV organopolysiloxane composition was obtained by the same procedure as in Comparative Example 1 except that 40 parts of calcium carbonate with a particle size of 0.08 μm and treated with 2.0% by weight of a dimethylsilicone resin (softening point 40° C.) was used instead of the 2.0% oleic acid-treated calcium carbonate.

Comparative Example 4

An RTV organopolysiloxane composition was obtained by the same procedure as in Example 1 except that 40 parts of calcium carbonate with a particle size of 0.08 μm and treated with 3.0% by weight of rhodinic acid was used instead of the 2.0% rhodinic acid-treated calcium carbonate.

The RTV organopolysiloxane compositions obtained in Examples 1–7 and Comparative Examples 1–4 were subject to a block H-1 type adhesion test according to JIS A 5758. The results are shown in Tables 1 and 2.

Block H-1 type adhesion test

Adherends:

A: float glass
B: fluoro-resin electrodeposited aluminum plate
C: Kainer fluoro-resin coated aluminum plate
D: glossy acryl resin electrodeposited aluminum plate
E: matte acryl resin electrodeposited aluminum plate Measurement:

Each of the RTV organopolysiloxane compositions was applied to an adherend and cured at a temperature of 20° C. and a humidity of 55% for 7 days. The resulting integral block was removed from the mold and aged for 7 days under the same conditions before it was measured for initial properties. In a water immersion test, the sample block as prepared above was immersed in water at 50° C. for 21 days before it was measured for properties again. In a heat resistance test, the sample block as prepared above was kept in a dryer at 1000° C. for 21 days before it was measured for properties again. The tensile tester used for the measurement of the sample block was Strograph R-2 manufactured by Toyo Seiki Mfg. K.K. which was operated at a pulling rate of 50 mm/min.

It is noted that Tmax is maximum tensile strength, Emax is maximum elongation, and CF is a percent retention of the sealant when the fractured surfaces of the adherend and the sealant after the tensile test were visually observed. Under the heading "Adherend," A to E stand for the above-mentioned adherends.

TABLE 1

| | | Curing conditions | | | | | | | |
|---|---|---|---|---|---|---|---|---|---|
| | | 20° C. × 55% × 14 days | | | 20° C. × 55% × 14 days | | | 20° C. × 55% × 14 days | | |
| | | | | | Test Conditions | | | | | |
| | | Initial | | | 50° C./21 days in water | | | heating 100° C./21 days | | |
| Example | Adherend | Tmax (kgf/cm$^2$) | Emax (%) | CF (%) | Tmax (kgf/cm$^2$) | Emax (%) | CF (%) | Tmax (kgf/cm$^2$) | Emax (%) | CF (%) |
| 1 | A | 13.1 | 284 | 100 | 7.7 | 362 | 100 | 8.6 | 343 | 100 |
| | B | 10.7 | 284 | 100 | 7.5 | 316 | 100 | 8.3 | 323 | 100 |
| | C | 10.6 | 266 | 100 | 7.5 | 340 | 100 | 8.6 | 350 | 100 |
| | D | 11.2 | 318 | 100 | 7.4 | 329 | 100 | 8.4 | 311 | 100 |
| | E | 10.5 | 301 | 100 | 7.4 | 310 | 100 | 8.2 | 309 | 100 |
| 2 | A | 12.3 | 267 | 100 | 8.1 | 301 | 100 | 9.2 | 297 | 100 |
| | B | 11.0 | 288 | 100 | 8.4 | 311 | 100 | 9.4 | 288 | 100 |
| | C | 10.9 | 299 | 100 | 8.5 | 322 | 100 | 9.5 | 276 | 100 |
| | D | 13.7 | 256 | 100 | 7.8 | 306 | 100 | 9.2 | 267 | 100 |
| | E | 11.7 | 259 | 100 | 7.5 | 299 | 100 | 8.9 | 279 | 100 |
| 3 | A | 9.7 | 213 | 100 | 8.2 | 255 | 100 | 7.9 | 220 | 100 |
| | B | 9.2 | 209 | 100 | 7.9 | 254 | 100 | 7.2 | 235 | 95 |
| | C | 9.3 | 204 | 100 | 8.1 | 245 | 100 | 7.3 | 218 | 100 |
| | D | 8.9 | 220 | 100 | 8.3 | 238 | 100 | 7.2 | 208 | 100 |
| | E | 8.8 | 197 | 100 | 8.2 | 244 | 100 | 7.3 | 207 | 100 |
| 4 | A | 7.4 | 199 | 100 | 5.7 | 240 | 100 | 6.8 | 211 | 100 |
| | B | 6.7 | 176 | 100 | 5.2 | 182 | 80 | 6.4 | 202 | 90 |
| | C | 6.9 | 179 | 100 | 4.9 | 212 | 90 | 6.7 | 203 | 100 |
| | D | 7.8 | 188 | 100 | 5.6 | 209 | 100 | 6.3 | 211 | 100 |
| | E | 7.2 | 170 | 100 | 5.1 | 234 | 90 | 6.1 | 221 | 100 |
| 5 | A | 8.8 | 245 | 100 | 4.8 | 299 | 100 | 7.8 | 252 | 100 |
| | B | 8.8 | 242 | 100 | 4.7 | 297 | 95 | 7.4 | 253 | 100 |
| | C | 7.9 | 211 | 100 | 4.6 | 291 | 100 | 7.5 | 249 | 100 |
| | D | 9.1 | 230 | 100 | 4.7 | 295 | 100 | 7.3 | 239 | 100 |
| | E | 8.7 | 223 | 100 | 4.5 | 288 | 90 | 7.9 | 243 | 100 |
| 6 | A | 9.9 | 295 | 100 | 7.0 | 270 | 100 | 8.3 | 263 | 100 |
| | B | 10.3 | 279 | 100 | 7.1 | 273 | 100 | 7.5 | 260 | 100 |
| | C | 7.9 | 200 | 100 | 7.3 | 297 | 100 | 8.1 | 255 | 100 |
| | D | 10.3 | 290 | 100 | 7.0 | 272 | 100 | 7.9 | 261 | 100 |
| | E | 9.5 | 289 | 100 | 7.2 | 264 | 100 | 7.5 | 256 | 100 |
| 7 | A | 6.5 | 189 | 100 | 6.0 | 211 | 100 | 5.2 | 172 | 100 |
| | B | 6.6 | 167 | 100 | 6.2 | 221 | 100 | 5.8 | 167 | 100 |
| | C | 5.4 | 190 | 100 | 6.4 | 224 | 100 | 5.9 | 168 | 100 |
| | D | 6.8 | 158 | 100 | 6.1 | 189 | 100 | 5.1 | 179 | 100 |
| | E | 5.3 | 188 | 100 | 6.4 | 199 | 100 | 5.9 | 158 | 100 |

TABLE 2

| Compara-tive Example | Adherend | Curing conditions | | | | | | | | |
|---|---|---|---|---|---|---|---|---|---|---|
| | | 20° C. × 55% × 14 days | | | 20° C. × 55% × 14 days | | | 20° C. × 55% × 14 days | | |
| | | Initial | | | Test Conditions 50° C./21 days in water | | | heating 100° C./21 days | | |
| | | Tmax (kgf/cm$^2$) | Emax (%) | CF (%) | Tmax (kgf/cm$^2$) | Emax (%) | CF (%) | Tmax (kgf/cm$^2$) | Emax (%) | CF (%) |
| 1 | A | 10.7 | 313 | 100 | 8.8 | 323 | 90 | 5.1 | 403 | 70 |
| | B | 10.8 | 300 | 0 | 7.2 | 390 | 0 | 3.7 | 223 | 0 |
| | C | 8.9 | 236 | 80 | 6.7 | 403 | 50 | 4.9 | 250 | 10 |
| | D | 9.7 | 328 | 100 | 7.4 | 356 | 100 | 5.0 | 210 | 50 |
| | E | 9.5 | 222 | 40 | 5.2 | 310 | 0 | 2.8 | 109 | 0 |
| 2 | A | 10.2 | 369 | 95 | 7.8 | 358 | 80 | 9.7 | 341 | 90 |
| | B | 7.4 | 174 | 0 | 7.0 | 171 | 0 | 7.4 | 162 | 0 |
| | C | 4.9 | 299 | 50 | 4.7 | 267 | 0 | 4.2 | 276 | 0 |
| | D | 11.4 | 368 | 80 | 6.9 | 389 | 50 | 5.2 | 233 | 30 |
| | E | 4.1 | 172 | 0 | 2.8 | 99 | 0 | 3.8 | 88 | 0 |
| 3 | A | 6.8 | 233 | 100 | 4.1 | 205 | 0 | s.9 | 210 | 80 |
| | B | 4.1 | 219 | 80 | 3.2 | 173 | 0 | 4.1 | 215 | 0 |
| | C | 5.3 | 214 | 80 | 3.8 | 195 | 0 | 4.3 | 201 | 50 |
| | D | 4.3 | 212 | 100 | 4.0 | 183 | 0 | 4.2 | 198 | 60 |
| | E | 4.6 | 187 | 70 | 2.2 | 104 | 0 | 4.3 | 109 | 0 |
| 4 | A | 10.5 | 380 | 90 | 8.0 | 387 | 70 | 8.9 | 355 | 90 |
| | B | 8.7 | 332 | 90 | 8.3 | 356 | 50 | 8.4 | 362 | 0 |
| | C | 10.4 | 311 | 90 | 8.1 | 356 | 70 | 8.1 | 333 | 80 |
| | D | 10.6 | 324 | 90 | 8.5 | 389 | 90 | 8.9 | 311 | 90 |
| | E | 10.2 | 302 | 80 | 5.1 | 234 | 0 | 4.0 | 221 | 0 |

As is evident from Tables 1 and 2, RTV organopolysiloxane compositions within the scope of the invention (Examples 1–7) provide a firm bond to surface treated aluminum plates and maintain such bond under water immersion and at elevated temperature.

Example 8

An RTV organopolysiloxane composition was obtained by charging a universal mixer with 60 parts of α,ω-dihydroxydimethylpolysiloxane having a viscosity of 50,000 centistokes, 40 parts of calcium carbonate with a particle size of 0.06 μm and treated with 2.0% by weight of rhodinic acid (melting point 162° C.), 6 parts of (methylethylketoxime)silane, 0.02 part of polypropylene glycol, 0.1 part of dibutyltin dimethoxide, 3 parts of surface treated fumed silica (trade name R-972 by Nippon Aerosil K.K.), and 1 part of γ-aminopropyltriethoxysilane, followed by debubbling and mixing.

Example 9

An RTV organopolysiloxane composition was obtained by the same procedure as in Example 8 except that 40 parts of calcium carbonate with a particle size of 0.06 μm and treated with 2.0% by weight of $C_{21}H_{43}COOH$ (melting point 82° C.) was used instead of the 2.0% rhodinic acid-treated calcium carbonate.

Example 10

An RTV organopolysiloxane composition was obtained by the same procedure as in Example 8 except that 40 parts of calcium carbonate with a particle size of 0.06 μm and treated with 2.0% by weight of a phenylsilicone resin (softening point 150° C.) was used instead of the 2.0% rhodinic acid-treated calcium carbonate.

Example 11

An RTV organopolysiloxane composition was obtained by the same procedure as in Example 8 except that 40 parts of calcium carbonate with a particle size of 0.06 μm and treated with 2.0% by weight of a dimethylsilicone resin (softening point 110° C.) was used instead of the 2.0% rhodinic acid-treated calcium carbonate.

Example 12

An RTV organopolysiloxane composition was obtained by the same procedure as in Example 8 except that 40 parts of calcium carbonate with a particle size of 0.15 μm and treated with 2.0% by weight of rhodinic acid was used.

Example 13

An RTV organopolysiloxane composition was obtained by the same procedure as in Example 8 except that 25 parts of α,ω-dihydroxydimethylpolysiloxane having a viscosity of 20,000 centistokes and 35 parts of α,ω-dihydroxydimethylpolysiloxane having a viscosity of 100,000 centistokes were used as the dimethylpolysiloxane and 40 parts of calcium carbonate with a particle size of 0.06 μm and treated with 2.0% by weight of rhodinic acid was used.

Example 14

An RTV organopolysiloxane composition was obtained by the same procedure as in Example 8 except that 7 parts of methyltrimethoxysilane was used instead of 6 parts of (methylethylketoxime)silane.

Example 15

An RTV organopolysiloxane composition was obtained by charging a universal mixer with 70 parts of α,ω-dihydroxydimethylpolysiloxane having a viscosity of 50,000 centistokes, 30 parts of calcium carbonate with a particle size of 0.06 μm and treated with 1.5% by weight of rhodinic acid (melting point 162° C.), 6 parts of (methylethylketoxime)silane, 0.02 part of polypropylene glycol, 0.1 part of dibutyltin dimethoxide, 3 parts of fumed silica (trade name Aerosil 200 by Nippon Aerosil K.K.), and 1 part of γ-aminopropyltriethoxysilane, followed by debubbling and mixing.

Example 16

An RTV organopolysiloxane composition was obtained by charging a universal mixer with 80 parts of α,ω-dihydroxydimethylpolysiloxane having a viscosity of 50,000 centistokes, 20 parts of calcium carbonate with a particle size of 0.06 μm and treated with 1.5% by weight of rhodinic acid (melting point 1620° C.), 6 parts of (methylethylketoxime)silane, 0.02 part of polypropylene glycol, 0.1 part of dibutyltin dimethoxide, 6 parts of surface treated fumed silica (R-972), and 1 part of γ-aminopropyltriethoxysilane, followed by debubbling and mixing.

Comparative Example 5

An RTV organopolysiloxane composition was obtained by charging a universal mixer with 60 parts of α,ω-dihydroxydimethylpolysiloxane having a viscosity of 50,000 centistokes, 40 parts of calcium carbonate with a particle size of 0.06 μm and treated with 2.0% by weight of stearic acid, 6 parts of (methylethylketoxime)silane, 0.02 part of polypropylene glycol, 0.1 part of dimethyltin dimethoxide, 3 parts of surface treated fumed silica (R-972), and 1 part of γ-aminopropyltriethoxysilane, followed by debubbling and mixing.

Comparative Example 6

An RTV organopolysiloxane composition was obtained by the same procedure as in Comparative Example 5 except that 40 parts of calcium carbonate with a particle size of 0.06 μm and treated with 2.0% by weight of a dimethylsilicone resin (softening point 40° C.) was used instead of the 2.0% stearic acid-treated calcium carbonate.

Comparative Example 7

An RTV organopolysiloxane composition was obtained by the same procedure as in Comparative Example 5 except that 40 parts of calcium carbonate with a particle size of 0.06 μm and treated with 3.0% by weight of rhodinic acid (melting point 162° C.) was used instead of the 2.0% stearic acid-treated calcium carbonate.

Comparative Example 8

An RTV organopolysiloxane composition was obtained by the same procedure as in Comparative Example 5 except that 40 parts of untreated colloidal calcium carbonate with a particle size of 0.06 μm was used instead of the 2.0% stearic acid-treated calcium carbonate.

The RTV organopolysiloxane compositions obtained in Examples 8–16 and Comparative Examples 5–8 were subject to a block H-1 type adhesion test according to JIS A 5758. The test procedure was the same as above except that mortar was used as an additional adherend. The results are shown in Tables 3 and 4. Under the heading of "Adherend" in these Tables, F stands for mortar while A to E are as defined previously.

TABLE 3

| | | Curing conditions | | | | | | | |
|---|---|---|---|---|---|---|---|---|---|
| | | 20° C. × 55% × 14 days | | | 20° C. × 55% × 14 days | | | 20° C. × 55% × 14 days | | |
| | | | | | Test Conditions | | | | |
| | | Initial | | | 50° C./21 days in water | | | heating 100° C./21 days | | |
| Example | Adherend | Tmax (kgf/cm²) | Emax (%) | CF (%) | Tmax (kgf/cm²) | Emax (%) | CF (%) | Tmax (kgf/cm²) | Emax (%) | CF (%) |
| 8 | A | 12.8 | 384 | 100 | 9.7 | 362 | 100 | 8.6 | 333 | 100 |
| | B | 11.7 | 384 | 100 | 9.5 | 416 | 100 | 8.3 | 323 | 100 |
| | C | 11.6 | 366 | 100 | 9.5 | 440 | 100 | 8.6 | 350 | 100 |
| | D | 11.2 | 418 | 100 | 9.4 | 429 | 100 | 8.4 | 311 | 100 |
| | E | 11.5 | 401 | 100 | 9.4 | 410 | 100 | 8.2 | 309 | 100 |
| | F | 10.9 | 355 | 100 | 8.7 | 322 | 100 | 8.1 | 296 | 100 |
| 9 | A | 13.3 | 276 | 100 | 9.1 | 310 | 100 | 10.8 | 288 | 100 |
| | B | 12.0 | 288 | 100 | 9.4 | 311 | 100 | 10.4 | 253 | 100 |
| | C | 11.9 | 299 | 100 | 9.5 | 333 | 100 | 10.7 | 299 | 100 |
| | D | 12.7 | 266 | 100 | 9.8 | 368 | 100 | 10.2 | 288 | 100 |
| | E | 12.7 | 295 | 100 | 9.5 | 301 | 100 | 10.9 | 292 | 100 |
| | F | 11.3 | 300 | 100 | 9.2 | 311 | 100 | 9.9 | 279 | 100 |
| 10 | A | 7.7 | 231 | 100 | 7.2 | 225 | 100 | 7.9 | 230 | 100 |
| | B | 7.2 | 219 | 100 | 7.9 | 234 | 100 | 7.2 | 235 | 90 |
| | C | 7.3 | 224 | 100 | 7.1 | 235 | 100 | 7.3 | 238 | 100 |
| | D | 7.9 | 202 | 100 | 7.3 | 238 | 100 | 7.2 | 240 | 100 |
| | E | 7.8 | 188 | 100 | 7.2 | 236 | 100 | 7.3 | 207 | 100 |
| | F | 7.1 | 203 | 100 | 7.5 | 235 | 100 | 7.4 | 211 | 100 |
| 11 | A | 6.4 | 299 | 100 | 5.2 | 204 | 100 | 5.8 | 211 | 100 |
| | B | 5.7 | 267 | 100 | 5.0 | 185 | 80 | 5.4 | 212 | 90 |
| | C | 6.9 | 279 | 100 | 5.9 | 192 | 90 | 5.7 | 223 | 100 |
| | D | 5.8 | 288 | 100 | 5.6 | 189 | 100 | 5.3 | 211 | 100 |
| | E | 6.2 | 271 | 100 | 5.1 | 214 | 90 | 5.1 | 212 | 100 |
| | F | 7.1 | 210 | 100 | 5.7 | 187 | 80 | 5.1 | 189 | 80 |
| 12 | A | 9.8 | 345 | 100 | 6.5 | 399 | 100 | 6.8 | 352 | 100 |
| | B | 9.8 | 324 | 100 | 6.9 | 397 | 95 | 6.4 | 335 | 100 |
| | C | 9.9 | 315 | 100 | 6.6 | 391 | 100 | 6.5 | 393 | 100 |
| | D | 10.1 | 305 | 100 | 6.7 | 395 | 100 | 6.3 | 339 | 100 |
| | E | 9.7 | 323 | 100 | 6.5 | 388 | 90 | 6.9 | 344 | 100 |
| | F | 9.3 | 299 | 100 | 6.2 | 378 | 95 | 6.1 | 379 | 100 |
| 13 | A | 9.9 | 295 | 100 | 7.0 | 270 | 100 | 8.3 | 263 | 100 |

TABLE 3-continued

| | | Curing conditions | | | | | | | |
|---|---|---|---|---|---|---|---|---|---|
| | | 20° C. × 55% × 14 days | | | 20° C. × 55% × 14 days | | | 20° C. × 55% × 14 days | | |
| | | Test Conditions | | | | | | | |
| | | Initial | | | 50° C./21 days in water | | | heating 100° C./21 days | | |
| Example | Adherend | Tmax (kgf/cm²) | Emax (%) | CF (%) | Tmax (kgf/cm²) | Emax (%) | CF (%) | Tmax (kgf/cm²) | Emax (%) | CF (%) |
| | B | 10.3 | 279 | 100 | 7.1 | 273 | 100 | 7.5 | 260 | 100 |
| | C | 7.9 | 200 | 100 | 7.3 | 297 | 100 | 8.1 | 255 | 100 |
| | D | 10.3 | 290 | 100 | 7.0 | 272 | 100 | 7.9 | 261 | 100 |
| | E | 9.5 | 289 | 100 | 7.2 | 264 | 100 | 7.5 | 256 | 100 |
| | F | 8.6 | 277 | 100 | 6.8 | 258 | 100 | 6.9 | 249 | 100 |
| 14 | A | 6.5 | 169 | 100 | 6.0 | 211 | 100 | 5.2 | 172 | 100 |
| | B | 6.6 | 167 | 100 | 6.2 | 221 | 100 | 5.8 | 167 | 100 |
| | C | 5.4 | 190 | 100 | 6.4 | 224 | 100 | 5.9 | 168 | 100 |
| | D | 6.8 | 15B | 100 | 6.1 | 189 | 100 | 5.1 | 179 | 100 |
| | E | 5.3 | 188 | 100 | 6.4 | 199 | 100 | 5.9 | 158 | 100 |
| | F | 5.2 | 169 | 100 | 4.9 | 188 | 100 | 4.9 | 152 | 100 |
| 15 | A | 8.4 | 321 | 100 | 6.8 | 332 | 100 | 7.3 | 299 | 100 |
| | B | 7.5 | 305 | 100 | 6.2 | 323 | 100 | 7.8 | 2B7 | 100 |
| | C | 8.1 | 298 | 100 | 6.9 | 315 | 100 | 7.4 | 282 | 100 |
| | D | 7.6 | 301 | 100 | 6.1 | 341 | 100 | 7.5 | 279 | 100 |
| | E | 7.2 | 288 | 100 | 7.0 | 301 | 100 | 6.5 | 262 | 100 |
| | F | 6.9 | 279 | 100 | 7.1 | 299 | 100 | 6.2 | 265 | 100 |
| 16 | A | 5.8 | 255 | 100 | 5.5 | 239 | 100 | 5.9 | 244 | 100 |
| | B | 5.4 | 265 | 100 | 5.3 | 249 | 100 | 5.3 | 252 | 100 |
| | C | 5.3 | 266 | 100 | 5.1 | 254 | 100 | 5.1 | 243 | 100 |
| | D | 5.9 | 252 | 100 | 5.2 | 249 | 100 | 5.2 | 239 | 100 |
| | E | 5.7 | 245 | 100 | 5.0 | 238 | 100 | 4.9 | 235 | 100 |
| | F | 5.1 | 246 | 100 | 5.3 | 229 | 100 | 5.6 | 241 | 100 |

TABLE 4

| | | Curing conditions | | | | | | | |
|---|---|---|---|---|---|---|---|---|---|
| | | 20° C. × 55% × 14 days | | | 20° C. × 55% × 14 days | | | 20° C. × 55% × 14 days | | |
| | | Test Conditions | | | | | | | |
| | | Initial | | | 50° C./21 days in water | | | heating 100° C./21 days | | |
| Comparative Example | Adherend | Tmax (kgf/cm²) | Emax (%) | CF (%) | Tmax (kgf/cm²) | Emax (%) | CF (%) | Tmax (kgf/cm²) | Emax (%) | CF (%) |
| 5 | A | 10.2 | 333 | 100 | 7.8 | 255 | 80 | 6.7 | 301 | 80 |
| | B | 9.4 | 264 | 90 | 5.5 | 171 | 0 | 3.4 | 102 | 0 |
| | C | 9.9 | 299 | 100 | 6.7 | 247 | 90 | 6.2 | 276 | 70 |
| | D | 10.4 | 268 | 100 | 7.9 | 229 | 50 | 5.2 | 133 | 50 |
| | E | 9.1 | 272 | 100 | 7.8 | 239 | 50 | 3.8 | B8 | 0 |
| | F | 8.7 | 288 | 70 | 6.1 | 122 | 0 | 5.5 | 225 | 0 |
| 6 | A | 6.8 | 233 | 100 | 4.1 | 205 | 20 | 5.9 | 210 | 80 |
| | B | 6.1 | 219 | 80 | 3.2 | 173 | 0 | 4.1 | 215 | 0 |
| | C | 6.3 | 214 | 80 | 3.8 | 195 | 40 | 4.3 | 201 | 50 |
| | D | 6.3 | 212 | 100 | 4.0 | 183 | 10 | 4.2 | 198 | 60 |
| | E | 6.6 | 187 | 70 | 2.2 | 104 | 40 | 4.3 | 109 | 0 |
| | F | 6.5 | 225 | 50 | 4.2 | 95 | 30 | 4.5 | 122 | 0 |
| 7 | A | 11.5 | 380 | 90 | 7.0 | 387 | 70 | 8.0 | 355 | 80 |
| | B | 9.7 | 332 | 90 | 7.3 | 356 | 0 | 8.4 | 362 | 0 |
| | C | 11.4 | 311 | 90 | 7.1 | 356 | 70 | 8.1 | 333 | 80 |
| | D | 11.6 | 324 | 90 | 7.5 | 389 | 50 | 8.9 | 311 | 50 |
| | E | 11.2 | 302 | 80 | 7.1 | 234 | 60 | 8.0 | 321 | 50 |
| | F | 10.2 | 289 | 80 | 3.4 | 102 | 0 | 8.2 | 305 | 0 |
| 8 | A | 10.8 | 322 | 100 | 7.5 | 255 | 80 | 8.9 | 265 | 80 |
| | B | 11.1 | 302 | 70 | 3.1 | 56 | 0 | 2.9 | 48 | 0 |
| | C | 10.1 | 346 | 100 | 6.9 | 215 | 70 | 7.7 | 266 | 70 |
| | D | 12.9 | 316 | 80 | 8.1 | 244 | 60 | 8.9 | 246 | 60 |
| | E | 10.4 | 311 | 80 | 7.4 | 261 | 60 | 8.1 | 259 | 60 |
| | F | 9.8 | 295 | 70 | 2.9 | 46 | 0 | 3.2 | 59 | 0 |

As is evident from Tables 3 and 4, RTV organopolysiloxane compositions within the scope of the invention (Examples 8–16) provide a firm bond to surface treated aluminum plates and mortar and maintain such bond under water immersion and at elevated temperature.

Japanese Patent Application Nos. 348321/1995 and 241439/1996 are incorporated herein by reference.

While the invention has been described in what is presently considered to be a preferred embodiment, other variations and modifications will become apparent to those skilled in the art. It is intended, therefore, that the invention not be limited to the illustrative embodiments, but be interpreted within the full spirit and scope of the appended claims.

We claim:

1. A room temperature vulcanizable organopolysiloxane composition comprising
   (1) a diorganopolysiloxane of the following general formula (I):

wherein $R^1$ is a substituted or unsubstituted monovalent hydrocarbon group and n is a positive integer,
   (2) an organic silicon compound having at least three hydrolyzable groups selected from the group consisting of ketoxime groups and alkoxy groups in a molecule, and
   (3) calcium carbonate which has been treated with up to 2.5% by weight based on the calcium carbonate of a treating agent which is an agent having a melting or softening point of at least 100° C. or an agent consisting of a saturated fatty acid represented by $C_mH_{2m+1}COOH$ wherein m is an integer of at least 20.

2. The room temperature vulcanizable organopolysiloxane composition of claim 1 further comprising (4) a fumed silica filler.

3. The composition of claim 2 which contains 0.1 to 30 parts by weight of the fumed silica per 100 parts by weight of the diorganopolysiloxane of formula (I) and treated calcium carbonate (3) combined.

4. The room temperature vulcanizable organopolysiloxane composition of claim 1 wherein the treating agent has a melting or softening point of at least 100° C. and is selected from the group consisting of rhodinic acid, a silicone resin, and a saturated fatty acid represented by $C_mH_{2m+1}COOH$ wherein m is an integer of at least 20.

5. The room temperature vulcanizable organopolysiloxane composition of claim 1 wherein the calcium carbonate has a mean particle size of up to 0.2 μm and has been treated with 1 to 2.5% by weight based on the calcium carbonate of the treating agent.

6. The composition of claim 1, wherein $R^1$ in formula (I) for the diorganopolysiloxane is a monovalent hydrocarbon group of 1–10 carbon atoms optionally substituted by halogen atoms or cyano groups.

7. The composition of claim 1, wherein each $R^1$ in formula (I) for the diorganopolysiloxane is, independently, an alkyl, alkenyl, phenyl, tolyl, cycloalkyl, benzyl or 2-phenylethyl group of 1–10 carbon atoms, optionally substituted by halogen atoms or cyano groups.

8. The composition of claim 1, wherein n in formula (I) for the diorganopolysiloxane is a positive integer from 50 to 2000.

9. The composition of claim 1, wherein the diorganopolysiloxane of the formula (I) is of one of the following formulae:

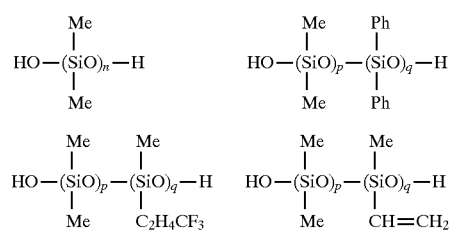

wherein n is a positive integer from 50 to 2000 and p and q are positive integers the sum of which is a positive integer from 50 to 2000.

10. The composition of claim 1 which contains 0.2 to 30 parts by weight of the organic silicon compound (2) per 100 parts by weight of the diorganopolysiloxane of formula (I) and 10 to 100 parts by weight of the treated calcium carbonate per 100 parts by weight of the diorganopolysiloxane of formula (I).

11. The composition of claim 1, which further comprises a condensation catalyst.

12. The composition of claim 1, wherein the organic silicon compound contains methoxy, dimethylketoxime, diethylketoxime or methylethylketoxime hydrolyzable groups.

13. The composition of claim 1, wherein the calcium carbonate has a mean particle size of 0.01 to 0.2 μm.

14. The room temperature vulcanizable organopolysiloxane composition of claim 1, wherein the organic silicon compound has a hydrolyzable group selected from the group consisting of methoxy, ethoxy, propoxy, butoxy, methoxyethoxy, dimethylketoxime, methylethylketoxime, diethylketoxime, cyclopentanoxime and cyclohexanoxime.

15. The composition of claim 1, wherein the organic silicon compound contains ketoxime hydrolyzable groups.

* * * * *